(12) United States Patent
Klein et al.

(10) Patent No.: US 10,891,307 B2
(45) Date of Patent: Jan. 12, 2021

(54) DISTRIBUTED DATA SYNCHRONIZATION IN A DISTRIBUTED COMPUTING SYSTEM

(71) Applicant: MICROSOFT TECHNOLOGY LICENSING, LLC, Redmond, WA (US)

(72) Inventors: Henning Klein, Bothell, WA (US); Cheng Huang, Bellevue, WA (US); Jieqing Wang, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 251 days.

(21) Appl. No.: 15/995,084

(22) Filed: May 31, 2018

(65) Prior Publication Data
US 2019/0370381 A1  Dec. 5, 2019

(51) Int. Cl.
*G06F 16/182* (2019.01)
*G06F 16/27* (2019.01)
*G06F 16/14* (2019.01)

(52) U.S. Cl.
CPC .......... *G06F 16/275* (2019.01); *G06F 16/152* (2019.01); *G06F 16/182* (2019.01)

(58) Field of Classification Search
CPC ..... G06F 16/275; G06F 16/182; G06F 16/152
See application file for complete search history.

(56) References Cited

U.S. PATENT DOCUMENTS

| | | | | |
|---|---|---|---|---|
| 2008/0212111 | A1* | 9/2008 | Masuda | G06F 16/93 358/1.9 |
| 2013/0151562 | A1* | 6/2013 | Fujii | G06F 16/152 707/780 |
| 2014/0114926 | A1* | 4/2014 | Anderson | G06F 16/245 707/687 |
| 2015/0199416 | A1* | 7/2015 | Kashyap | G06F 16/275 707/622 |

(Continued)

OTHER PUBLICATIONS

Efficient Synchronization of a Partial Namespace in NDN, Zhang et al., 2016, NDN Technical Report, all pages. (Year: 2016).*

(Continued)

*Primary Examiner* — Jay A Morrison
*Assistant Examiner* — Antonio J Caiado
(74) *Attorney, Agent, or Firm* — Shook, Hardy & Bacon L.L.P.

(57) ABSTRACT

Various embodiments, methods and systems for implementing distributed data synchronization in a distributed computing system, are provided. In operation, a data record of a first data set is accessed. The data record is encoded to generate, for a first distributed invertible bloom filter ("DIBF") data structure, a first DIBF record. The first DIBF record comprises a data field and a quantifier field that includes a quantifier value, which represents a reference count for the first DIBF record. The first and second DIBF data structures are accessed and decoded based at least in part on computing a difference between a quantifier value in the first DIBF data structure and a quantifier value in the second DIBF data structure. A determination whether a (Continued)

match exists between the first DIBF data structure and second DIBF data structure is made based on computing the difference between the first and second DIBF data structures.

20 Claims, 13 Drawing Sheets

(56) References Cited

U.S. PATENT DOCUMENTS

| | | | | |
|---|---|---|---|---|
| 2016/0078100 | A1* | 3/2016 | Anderson | G06F 16/2228 707/690 |
| 2017/0017435 | A1* | 1/2017 | Peeters | G06F 9/467 |
| 2018/0165181 | A1* | 6/2018 | Isman | G06F 16/217 |
| 2019/0363891 | A1* | 11/2019 | Naito | H04L 9/06 |

OTHER PUBLICATIONS

Set Reconciliation via Counting Bloom Filters, Guo et al., 2013, IEEE, all pages. (Year: 2013).*

Shed More Light on Bloom Filter's Variants, Patgiri et al.,Int'l Conf. Information and Knowledge Engineering, all pages. (Year: 2018).*

Eppstein, et al., "What's the Difference? Efficient Set Reconciliation without Prior Context", in Proceedings of the ACM Sigcomm 2011 Conference, Aug. 15, 2011, pp. 218-229.

Goodrich, et al., "Invertible Bloom Lookup Tables", in Proceedings of 49th Annual Allerton Conference on Communication, Control, and Computing, Jan. 12, 2011, 24 Pages.

Luo, et al., "Efficient Multiset Synchronization", in Journal of IEEE/ACM Transactions on Networking, vol. 25, Issue 2, Apr. 1, 2017, pp. 1190-1205.

Mitzenmacher, et al., "Simple Multi-Party Set Reconciliation", in Distributed Computing, vol. 31, No. 6, Oct. 23, 2017, pp. 441-453.

"International Search Report and Written Opinion Issued in PCT Application No. PCT/US2019/032331", dated Jul. 25, 2019, 11 Pages.

* cited by examiner

| DATA | HASH | QUANTIFIER |
|---|---|---|
| D1 * QA = 55 * 10 = 550 | HASHD1 * QA = 10 * 10 = 100 | 10 |
| D1 * QB = 55 * 100 = 5500 | HASHD1 * QB = 10 * 100 = 1000 | 100 |

401

| (INDEX) | DATA | HASH | QUANTIFIER |
|---|---|---|---|
| 0 | 0 | 0 | 0 |
| 1 | 0 + 550 + 5500 = 6050 | 0 + 100 + 1000 = 1100 | 0 + 10 + 100 = 110 |
| 2 | 0 + 550 + 5500 = 6050 | 0 + 100 + 1000 = 1100 | 0 + 10 + 100 = 110 |

405

| DATA | HASH | QUANTIFIER |
|---|---|---|
| D2 * QA = 89 * 10 = 890 | HASHD2 * QA = 17 * 10 = 170 | 10 |
| D2 * QB = 89 * 100 = 8900 | HASHD2 * QB = 17 * 100 = 1700 | 100 |

401-1

| (INDEX) | DATA | HASH | QUANTIFIER |
|---|---|---|---|
| 0 | 0 + 890 + 8900 = 9790 | 0 + 170 + 1700 = 1870 | 0 + 10 + 100 = 110 |
| 1 | 6050 | 1100 | 110 |
| 2 | 6050 + 890 + 8900 = 15840 | 1100 + 170 + 1700 = 2970 | 110 + 10 + 100 = 220 |

409

| (INDEX) | DATA | HASH | QUANTIFIER |
|---|---|---|---|
| 0 | 0 + 890 = 890 | 0 + 170 = 170 | 0 + 10 = 10 |
| 1 | 6050 | 1100 | 110 |
| 2 | 6050 + 890 = 6940 | 1100 + 170 = 1270 | 110 + 10 = 120 |

401-1

| (INDEX) | DATA | HASH | QUANTIFIER |
|---|---|---|---|
| 0 | 0 + 890 + 8900 = 9790 | 0 + 170 + 1700 = 1870 | 0 + 10 + 100 = 110 |
| 1 | 6050 | 1100 | 110 |
| 2 | 6050 + 890 + 8900 = 15840 | 1100 + 170 + 1700 = 2970 | 110 + 10 + 100 = 220 |

409

| (INDEX) | DATA | HASH | QUANTIFIER |
|---|---|---|---|
| 0 | 0 + 890 = 890 | 0 + 170 = 170 | 0 + 10 = 10 |
| 1 | 6050 | 1100 | 110 |
| 2 | 6050 + 890 = 6940 | 1100 + 170 = 1270 | 110 + 10 = 120 |

411

| (INDEX) | DATA | HASH | QUANTIFIER |
|---|---|---|---|
| 0 | 9790 − 890 = 8900 | 1870 − 170 = 1700 | 110 − 10 = 100 |
| 1 | 6050 − 6050 = 0 | 1100 − 1100 = 0 | 110 − 110 = 0 |
| 2 | 15840 − 6940 = 8900 | 2970 − 1270 = 1700 | 220 − 120 = 100 |

*FIG. 4B.*

DISTRIBUTED DATA SYNCHRONIZATION IN A DISTRIBUTED COMPUTING SYSTEM

BACKGROUND

Users often rely on applications and services to perform computing tasks. Distributed computing systems (e.g., cloud computing platforms) are computing architectures that support network access to a shared pool of configurable computing and storage resources. A distributed computing system can support building, deploying and managing applications and services. An increasing number of users and enterprises are moving away from traditional computing architectures to run their applications and services on distributed computing systems. With the ever-increasing use of distributed computing systems improvements in computing operations for managing distributed data and, in particular, distributed data synchronization can provide more efficient processing of distributed data and efficiency in storage and retrieval of distributed data.

SUMMARY

Embodiments of the present invention relate to methods, systems, and computer storage media for providing a distributed computing system that supports distributed data synchronization using a distributed invertible bloom filter ("DIBF"). By way of background, a distributed computing system having distributed storage system can implement a distributed file system. The distributed file system can include data that is replicated across multiple storage nodes. For example, the distributed file system can have metadata as distributed files and distributed data blocks corresponding to the metadata. The distributed file system can also include data managers operating based on a set of protocols that support accessing and processing the metadata and corresponding distributed data blocks. In particular, the data managers may implement a referencing mechanism associated the metadata and corresponding distributed data blocks in the distributed computing system. One of the challenges arising from managing data in a distributed computing system is providing synchronization of data when the data is managed in a distributed manner. For example, when data is managed as metadata in distributed files with corresponding distributed data blocks, updating and verifying the correctness of data may require impractical operations. For example, the size of data in distributed computing systems would have a significant negative impact on the distributed computing system network, if the data has to be transferred between data managers for data synchronization. Conventional approaches, such as checksums and an Invertible Bloom Filter, discussed below in more detail, exist for addressing data synchronization problems; however such approaches have data operations and data structures that fall short for comprehensively supporting comparing and decoding different types of arrangements of metadata distributed files and corresponding distributed data blocks.

Embodiments described in the present disclosure are directed towards technologies for improving distributed data synchronization using a distributed invertible bloom filter. At a high level, distributed data synchronization includes a distributed invertible bloom filter ("DIBF") data structure that enables encoding and decoding operations for determining whether multiple datasets match. Data records having data (e.g., fixed data) and a quantifier variable are parsed into DIBF records. The DIBF comprises a linear-operation-based aggregation of the data and the quantifier. The DIBF record is inserted into a DIBF data structure, such that multiple DIBF data structures can be aggregated and compared. Two datasets corresponding to a first DIBF data structure and second DIBF data structure may be compared to determine whether the two datasets match. If there is a difference in the first and second DIBF data structure values, for the data values or the quantifier value, the non-matching record may be retrieved during the decoding process.

Accordingly, one exemplary embodiment of the present invention provides improved distributed data synchronization in a distributed computing system. Initially, a data record of a first data set is accessed. The data record is encoded to generate, for a first distributed invertible bloom filter ("DIBF") data structure, a first DIBF record. The first DIBF record comprises a data field and a quantifier field that includes a quantifier value, which represents a reference count for the first DIBF record. The first DIBF data structure and a second DIBF data structure are accessed and decoded based at least in part on computing a difference between a quantifier value in the first DIBF data structure and a quantifier value in the second DIBF data structure. A determination whether a match exists between the first DIBF data structure and second DIBF data structure is made based on computing the difference between the first and second DIBF data structures.

As such, the embodiments described herein improve computing operations for distributed data synchronization for distributed files and corresponding distributed data blocks that are managed using data managers in a distributed computing system. For example, network latency is reduced in the distributed computing system infrastructure and throughput is increased as the distributed data synchronization operations more efficiently identify overlapping data records in data managers, as such, eliminating the burden of transferring a significant portion of the distributed data across the distributed computing system network. In this regard, the distributed data synchronization system addresses the specific problem of managing distributed data and improves the existing data synchronization processes in distributed computing system.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein:

FIG. 4A is a schematic diagram illustrating an example distributed data synchronization operation, in accordance with embodiments of the present invention;

FIG. 4B is a schematic diagram illustrating an example distributed data synchronization operation, in accordance with embodiments of the present invention;

DETAILED DESCRIPTION

Figure 1:
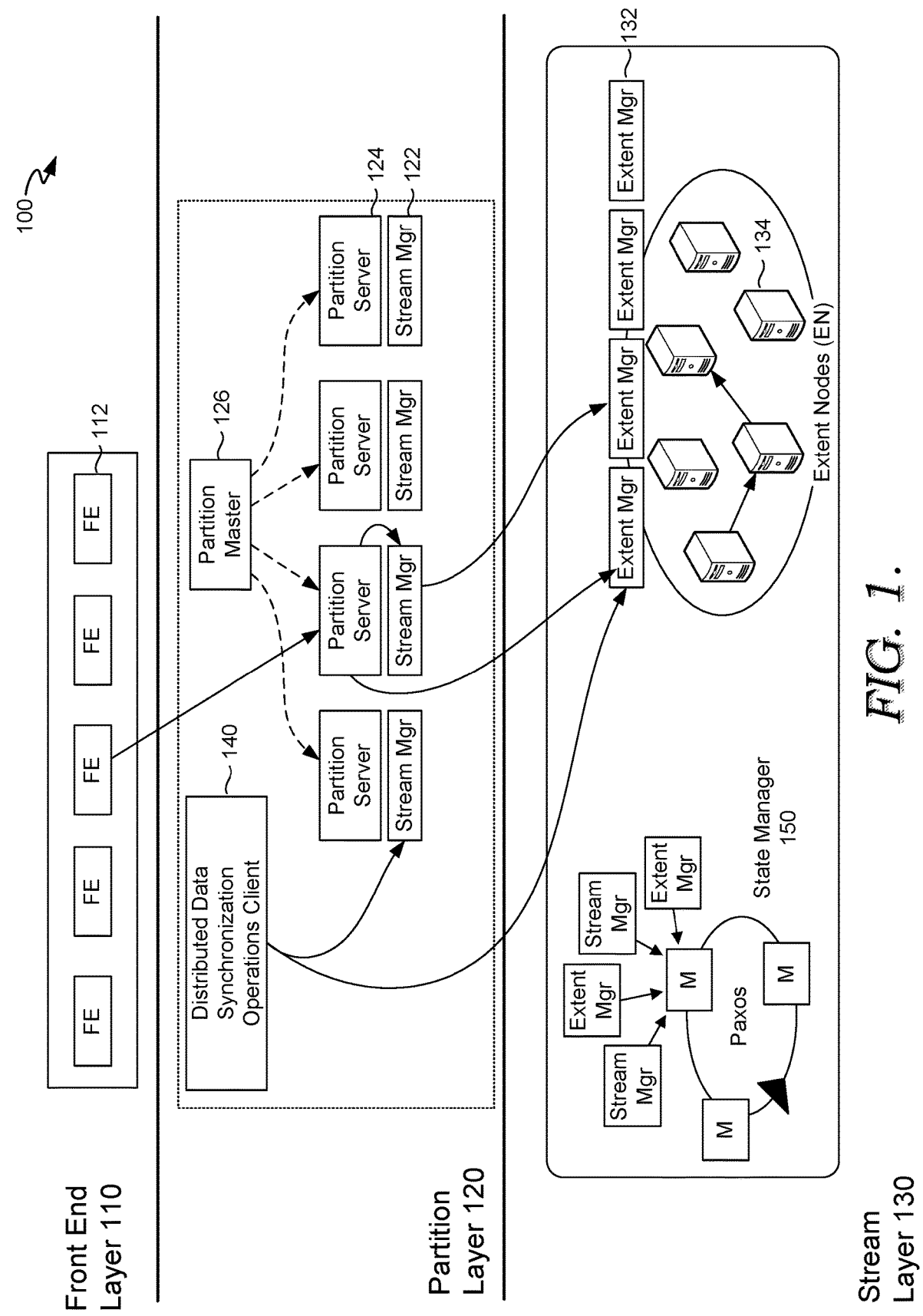
FIG. 1 is a block diagram of an example distributed computing for providing distributed data synchronization, in accordance with embodiments of the present invention.

Distributed computing systems support providing applications and services to perform computing tasks. Distributed computing systems can provide distributed computing storage for storing distributed data. For example, a significant amount of data is stored and managed in a distributed manner for applications and services operating in distributed computing system. Distributed data management can support different types of distributed data (e.g., distributed files, distributed data blocks) that support different types of functionality, such as high availability, redundancy, and erasure coding. For example, data may be replicated across multiple storage devices to help both data recovery and keeping sessions requiring the same data to function as seamless as possible, without delay. Replication can be verified as part of a data synchronization process. Data synchronization ensures that the same copy or version of data is available on different devices. Each identical set of data across each storage device should be consistent and uniform. For example, when a modification occurs in one version of a dataset, the same modification needs to be reflected in corresponding versions of the dataset. When modifications are not reflected, the non-modified dataset will yield inconsistent results for operations on the dataset.

In operation, data synchronization typically occurs multiple times and requires several Input/Out (I/O) operations, which can hurt computing performance. For example, an application associated with several files, where each individual file is stripped in several data blocks across multiple server hosts may be periodically evaluated for data correctness using data synchronization operations. Accordingly, reading back each block of each file for each replicated set of data as part of the synchronization process can cause an increase in network latency or throughput problems among other inefficiencies.

In distributed computing systems, for example, a distributed computing system providing distributed data management using stream managers and extent managers, managing distributed data can be challenging because of the consistency that has to be maintained between distributed datasets. A detailed discussion of a distributed computing system (which can be a suitable computing environment for various embodiments of the present disclosure) is further described below with reference to FIG. 9. By way of background, streams are ordered lists of extents and extents are storage units (e.g., structured data blocks, etc.). For redundancy and high availability purposes there are replicas for each extent that are involved in the synchronization processes. The distributed computing system separates stream metadata from extent metadata and manages them separately. Extent managers manage extents whereas stream managers manage streams. Each stream set includes a metadata space that identifies extent references. These extent references can move from one stream manager to another when an extent is appended to a stream in a different partition and the source stream is deleted afterwards. For performance reasons, it is desirable not to have the stream managers query the extent managers to move extent references around. Synchronizing metadata streams on stream managers with corresponding data blocks on extent managers may be complicated when having to perform certain management operations including updating, from an extent manager, partial metadata (e.g., length and sealing information) in metadata streams stored in stream manager and verifying the correctness of distributed metadata streams to check the equality of the data redundancy. Updating metadata in metadata streams for unsealed extents may be performed by sending a list of the modified records to the stream manager having the metadata stream; however in the distributed computing system. where a significant number of extents are sealed, the burden on the network would be significant if sealed extents have to be transferred over the network for synchronization.

Conventional approaches for addressing data synchronization problems lack the data structure and operations for managing certain arrangements of disturbed data. For example, a checksum mechanism can perform checksum operations as part of data synchronization. A typical process to reduce the transferred data load and still detect differences in data is to compute a checksum on the source data and each copy of data. However, checksums often only provide a count to ensure that the same quantity of bits that was transmitted was also received. But if there is no match in the count, checksums give no indication of exactly what data became corrupt. As such, the checksum mechanism is limited in providing comprehensive data synchronization for distributed data.

Another conventional approach is an Invertible Bloom Filter (IBF) algorithm that operates to compare and decode differences in a limited number of non-matching entries. An IBF data structure can be encoded using an exclusive or ("XOR") operation to merge a selected data record into the IBF data structure. Two IBF distributed datasets are compared by performing an XOR to determine if the data matches. The success of the decoding process depends on the ratio of the chosen size of the IBF data structure to the number of non-matching records. By way of example, with reference to a distributed computing system operating stream managers and extent managers, a comparison between two datasets would result in a lot missing records on a stream manager side, as not all extents known to the extent manager would be referenced from a single stream manager. Also, to create a full list of extents from the stream manager side, the IBF structure of individual stream managers would need to be merged; this is not possible with overlapping data records, as even numbers of the same data records would be cancelled out. Moreover, simply adding a reference count property in the IBF data structure does not also work as metadata stream data records would not match and instead be treated as different records.

As such, IBF data structures and operations fall short of comprehensively supporting comparing and decoding different types of arrangements of metadata distributed files and corresponding distributed data blocks. There is a realization that conventional IBF and other approaches lack a data structure that would adequately support distributed data synchronization. As such, a comprehensive system that addresses the challenges identified above and other challenges is integral to providing distributed data synchronization functionality.

Embodiments of the present invention relate to simple and efficient methods, systems, and computer storage media for improving distributed data synchronization in distributed computing systems. At a high level, distributed data synchronization includes a distributed invertible bloom filter ("DIBF") data structure that enables encoding and decoding operations for determining whether multiple datasets match. Data records having a quantifier variable are transformed into DIBF records and inserted into a DIBF data structure, such that multiple DIBF data structures can be aggregated and compared. A DIBF record can include a data field and a quantifier field with DIBF record values. The data field may include a fixed data field and a hash data field with corresponding data values (i.e., fixed data elements and hash data elements). The quantifier field may include a quantifier value. The quantifier values may represent referencing information for the data records. Two datasets corresponding to a first DIBF data structure and second DIBF data structure may be compared to determine whether the two datasets match. If there is a difference in the first and second DIBF data structure values, for the data values or the quantifier value, the non-matching record may be retrieved during the decoding process.

Embodiments of the present invention may be described by way of example, in particular, with reference to a distributed computing system having stream managers and extent managers. Nonetheless, the example description is not meant to be limiting; it is contemplated that embodiments of the present invention may be applied in different types of distributed computing system infrastructures. In operation, a distributed computing system may implement several components to perform operations associated with providing distributed data synchronization based on a Distributed Invertible Bloom Filter ("DIBF"). The components may perform the specific operations using a distributed data synchronization operations client and other components that are supported by the distributed computing system. The distributed computing system corresponds to the distributed computing system described herein with reference to FIG. 1, discussed below in more detail.

Figure 2A:
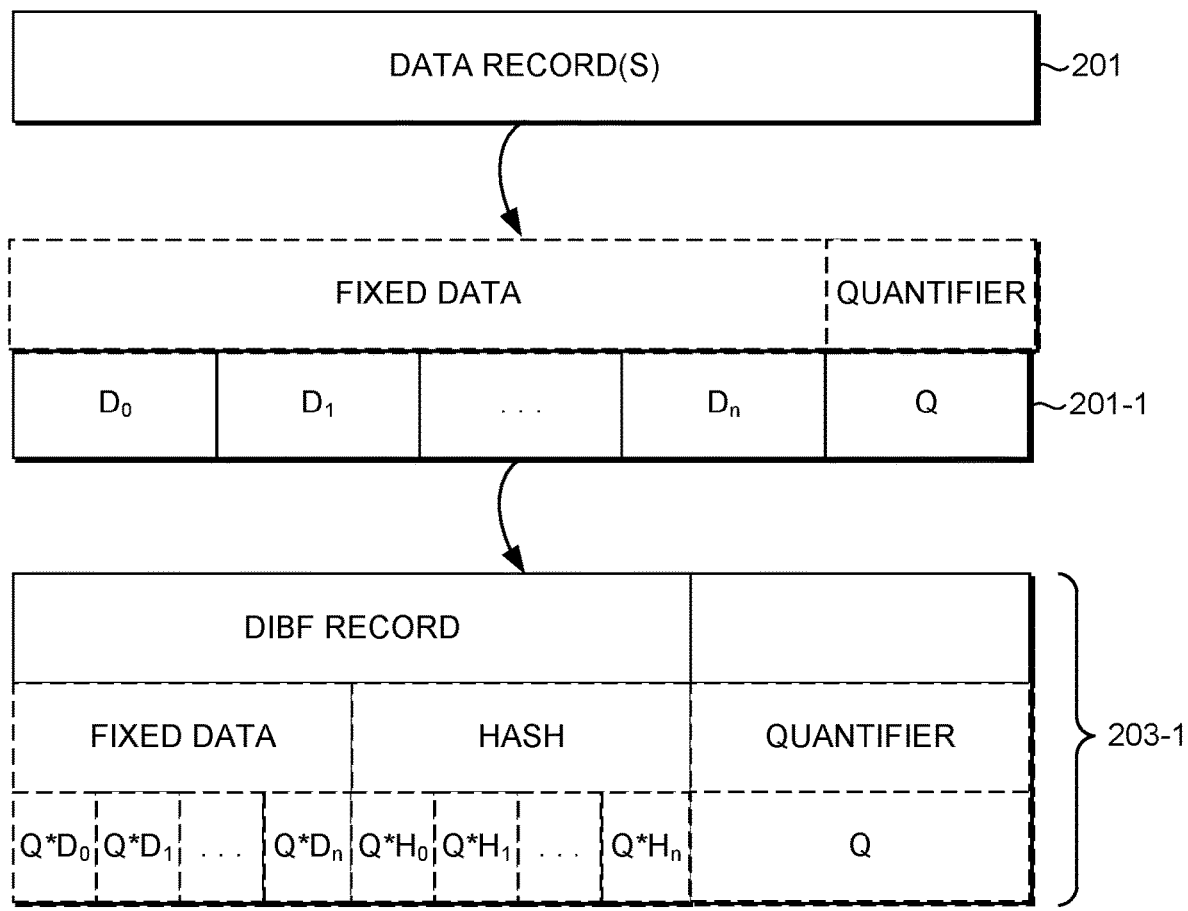
FIG. 2A is a block diagram illustrating an example data structure providing distributed data synchronization, in accordance with embodiments of the present invention.

FIG. 2A is a block diagram showing aspects of the encoding process of one or more data records, according to embodiments of the present invention. A data record can be or include any suitable data set, such as metadata, data blocks, payloads of data, etc. For example, in a distributed computing system, the data records can be stream or extent metadata, such as quantity of streams referencing the extent, length of the extent, the date, etc. FIG. 2A illustrates generating one or more DIBF records from data records, where DIBF record values of the DIBF record are generated from data record values. The DIBF records are inserted into DIBF data structure, such that multiple instances of DIBF data structures can be aggregated and compared. Accordingly, if there is a difference in a first and second DIBF data structure, the data values or the quantifier value, the non-matching entries may be returned during the decoding process.

Encoding may begin by parsing or splitting the one or more data records 201 into fixed data units $D_0$-$D_n$ (e.g., parts of a data block, file, etc.) and identifying quantifying bits Q as shown in 201-1. The "quantifying bit" "quantifier" or "quantifier value or field" as disclosed herein may refer to metadata values that specify reference information associated with multiple hosts. For example, a first server host that includes the DIBF record 203-1 may manage resources that are referenced from other server hosts. As such, in some embodiments, the data record quantifier field includes a reference count or number of times and/or identity of server hosts that need to reference the first physical host or its data. In this way, data can be verified or synchronized across multiple server hosts or storage devices without reading back, from each server host or storage device, the entire data set. In some embodiments, the quantifier value is or includes a reference count of an extent or stream, which is stored across stream managers and extent managers, which can be stored across multiple hosts.

It is contemplated that embodiments of the present invention may be implemented with variable length data units $D_0$-$D_n$. In operation, first generate hash ($D_0$) to hash ($D_n$), which will be fixed size hash units. Then use these as original input to DIBF (this means calculating hash on this hash units again per DIBF encoding process) the input fixed size hash units into DIBF and DIBF data structure. During the aggregation and decode process if the difference is empty difference then the original variable length data units all match; however the difference is non-empty difference, then proceed with decoding to get the difference hash units. Then scan original variable length data units, calculate hash of each data unit, where whichever ones match the decoded belong to set difference.

The DIBF record 203-1 is then generated by generating a hash function for each of the fixed data units $D_0$ through $D_n$ and multiplying each fixed data unit (e.g., byte) and each hash data unit hash($D_0$) through hash($D_n$) by the quantifier value Q as illustrated in DIBF record 203-1. It is contemplated that has function may have to meet to following property: hash(A+B) !=hash(A)+hash(B) to reliably find entries. Hash data units can be calculated according to any suitable hash function such as digit rearrangement methods, folding methods, radix transformation methods, etc. Each of these hash data units can then be used to index and retrieve each of the fixed data units and/or the entire DIBF record 203-1. In this regard, the DIBF record 203-1 may include a data field and a quantifier field with corresponding DIBF record values (i.e.; data values and quantifier values). The data field may include a fixed data field and a hash data field with corresponding data values (i.e., fixed data elements and hash data elements). The quantifier field may include a quantifier value.

Using these indexes and computations illustrated below, the DIBF record 203-1 in embodiments is inserted into a DIBF data structure. In particular, the DIBF record 203-1 may be inserted in a position of the DIBF data structure selected from multiple array positions of a lookup table data structure. For example, at a first time a first DIBF record can be inserted into a table at position Z. At a second time, a DIBF record may also be inserted into the same table at position Z such that the first entry and second entry may be appended into the same record X (e.g., a resulting entry). In some instances, if there are no other entries within the existing table, the DIBF record 203-1 are copied and inserted in multiple empty records of the table with no other existing entries. For example, the DIBF record 203-1 can be copied 2 additional times and each of those copies and the source data can be inserted into a DIBF table with no other appended data within the table. As such, with embodiments of the present invention, the DIBF data structure is updated with DIBF records by adding DIBF records to existing ones; in particular, adding data values, hash values, and quantifier values of a DIBF record to existing data values, hash values and quantifier values of a DIBF data structure. In contrast, IBF uses an XOR operations to compute each byte, compared to the DIBF records using addition.

In an example illustration of the computations that may be performed to support adding the DIBF record to the DIBF data structure, a fixed data unit (e.g., $D_0$) may be used to compute an fixed data element (e.g., $Q^*D_n$) of the DIBF record 203-1 by the following representation:

$$DIBF\ Record_{[element]} = \sum_{1}^{InsertionCount} Q_i * D_{i\ [element]} \quad \text{Equation 1}$$

where "element" is the index to each fixed data element (e.g., byte) of the fixed data elements and hash data elements and i is the insertion operation adding data into an individual DIBF record of a DIBF data structure (e.g., table structure). The quantifier value (Q) of a DIBF record is the sum of all quantifier values (e.g., reference count increments) that get added into a particular DIBF record.

A particular property of this algorithm is that two or more DIBF records with the same fixed data generate an equal hash value (before multiplication) and get added into the same set of DIBF record entries of the DIBF data structure. For two identical fixed data units D with different quantifier values $Q_A$ and $Q_B$ this leads to:

$$Q_A*D_{[element]}+Q_B*D_{[element]}=(Q_A+Q_B)*D_{[element]} \quad \text{Equation 2}$$

Therefore, multiple insertions of DIBF records with the same fixed data compute the same result if the sum of their quantifier values match.

In some embodiments, multiple randomly distributed insertion positions within a table for each DIBF record are generated based on using only a single hash value as a seed to initialized a pseudorandom number generator that generates the remaining insertion positions or hashes. This is in contrast to solutions, such as IBF that hash original data with multiple hash functions, which consumes a significant portion of encoding time. A pseudorandom number generator generates numbers (e.g., insertion positions for a lookup table) that are sufficiently close to random and is used in embodiments to insert one or more DIBF record randomly within a DIBF record table. A "seed" is a number or vector utilized to initialize a pseudorandom number generator. In an illustrative example, hash H4 can be used as a seed value input into the pseudorandom number generator and the output can be hashes H6, H7, and H8.

Figure 2B:
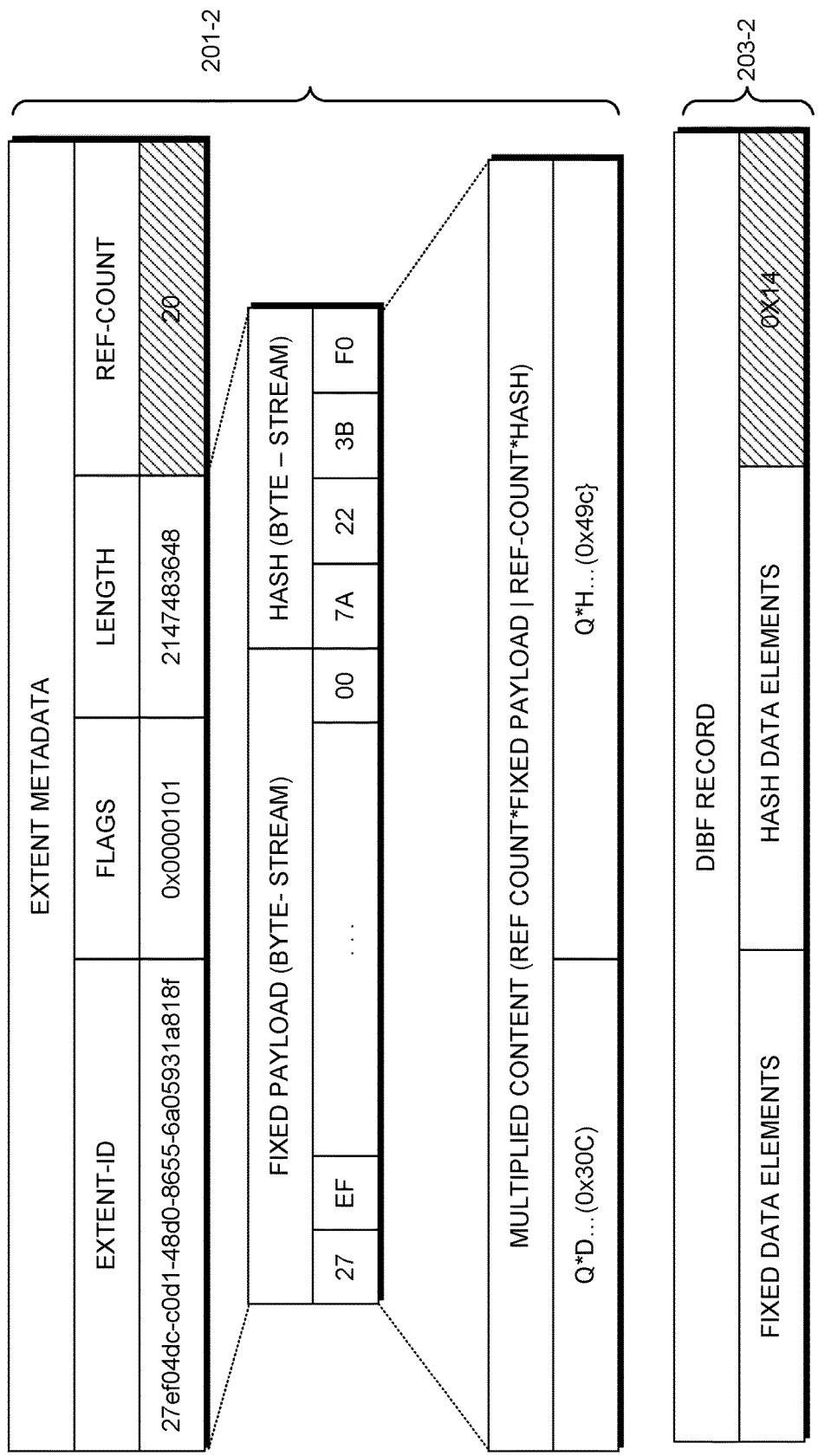
FIG. 2B is a block diagram illustrating an example data structure providing distributed data synchronization, in accordance with embodiments of the present invention.

FIG. 2B is a block diagram showing aspects of the encoding process of extent data into a DIBF record, according to embodiments. In some embodiments, FIG. 2B illustrates a specific example of the DIBF record indicated in FIG. 2A in a distributed computing system. Data record 201-2 is an extent metadata record, which includes extent ID information, flag bit(s), the length of the record 201-2, and a reference count or quantity of times that the record 201-2 is referenced by other hosts. The extent ID, flags, and the length are all parsed into fixed data units, as represented by individual units of the fixed payload (byte-stream). For example, FIG. 2B illustrates that the extent ID of 27ef04dc-c0d1-48d0-8655-6a05931a818f is parsed or grouped by at least its first two characters of the extent ID—"27" and "EF," each of which are considered fixed data elements. A hash is then generated for fixed data units, as illustrated under the hash (byte-stream). The DIBF record 203-2 includes a data field that includes a fixed data field and a hash data field with corresponding data values. The data field may have corresponding data values generated using the quantifier field value (i.e., quantifier value). As shown, the data values are generated based on multiplying fixed data units by the quantifier value and hash data units by the quantifier value. The DIBF record 203-2 that is inserted into the DIBF data structure has DIBF record values including fixed data elements, hash data elements and a quantifier value.

Figure 3:
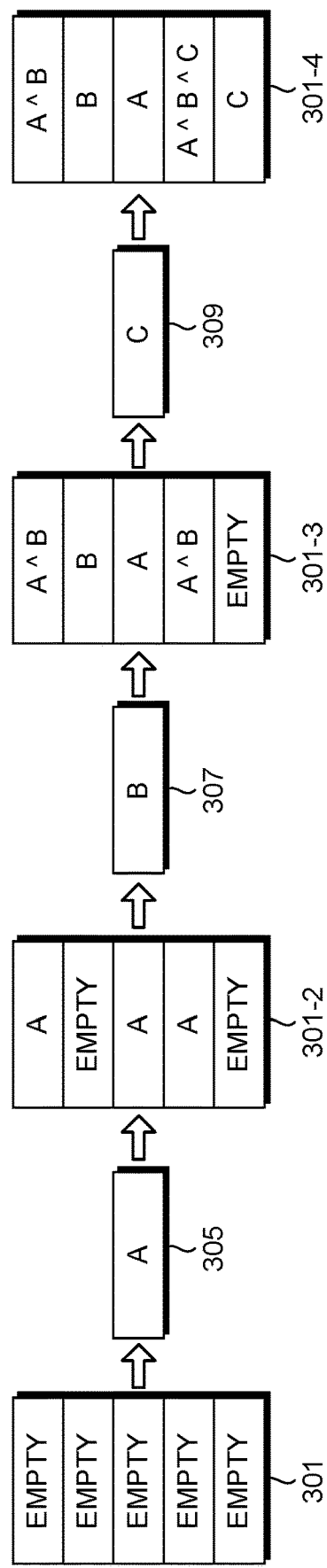
FIG. 3 is a schematic diagram illustrating an example distributed data synchronization operation, in accordance with embodiments of the present invention.

FIG. 3 is a schematic diagram illustrating how DIBF record entries can be merged into a table, according to embodiments. FIG. 3 illustrates that even a single record within a DIBF data structure can include other DIBF record entries and corresponding DIBF data structure values (i.e., data values and quantifier values). At a first time the table 301 is empty such that no DIBF records are generated or appended to the table. A "table" as described herein corresponds in some embodiments to a DIBF data structure that includes DIBF records for implementing embodiments of the present disclosure. For example, a table can include a plurality of DIBF records, each of which include particular fields and values, such as those illustrated in FIG. 2. (e.g., fixed data field with fixed data elements, hash data field with hash data elements, and quantifier field with a quantifier value). In some embodiments, the data structure need not be a lookup table, but can be any suitable data structure, such as binary trees, B trees, etc. In some embodiments, the DIBF record values are or include different or additional dedicated fields, such as a key field, a value field, and/or a count field, etc.

At a second subsequent time, the DIBF record 305 (A) is generated and inserted as three entries within the table 301-2. Each of the tables 301-2, 301-3, and 301-4 can represent the table 301 as it exists at different points in time. At a third time, which is subsequent to the second time, the DIBF record 307 (B) is appended to the table 301-3 such that it shares the same entry with A twice and has its own individual record. At a fourth subsequent time, the DIBF record 309 (C) is appended to the table 301-4 such that it is inserted into a position that is shared by both A and B and has its own record. In some embodiments, the "DIBF record" is, for example illustrated in the table 301-4, where the record that shares all of the entries of A, B, and C. In other embodiments, no additional records have been appended, as represented in the table 301-2, and the resulting records are each of the records "A".

FIG. 4A and FIG. 4B are discussed below with reference to the table provided below:

TABLE '1

DIBF1 computation

HashD1 = 5 + 5 = 10

DIBF1_D1Posititon1 = 10 MODULO 3 = 1

TABLE 1-continued

| DIBF1 computation | | | |
|---|---|---|---|
| DIBF1_D1Posititon2 = 10 MODULO 3 + 1 = 2 | | | |
| DIBFRecordD1: | | | |
| Data | Hash | | Quantifier |
| D1 * QA = 55 * 10 = 550 | HashD1 * QA = 10 * 10 = 100 | | 10 |
| D1 * QB = 55 * 100 = 5500 | HashD1 * QB = 10 * 100 = 1000 | | 100 |

| DIBF1 (Index) | Data | Hash | Quantifier |
|---|---|---|---|
| 0 | 0 | 0 | 0 |
| 1 | 0 + 550 + 5500 = 6050 | 0 + 100 + 1000 = 1100 | 0 + 10 + 100 = 110 |
| 2 | 0 + 550 + 5500 = 6050 | 0 + 100 + 1000 = 1100 | 0 + 10 + 100 = 110 |

| | | | |
|---|---|---|---|
| HashD2 = 8 + 9 = 17 | | | |
| DIBF1_D1Posititon1 = 17 MODULO 3 = 2 | | | |
| DIBF1_D1Posititon2 = 17 MODULO 3 + 1 = 0 | | | |
| DIBFRecordD2: | | | |
| Data | Hash | | Quantifier |
| D2 * QA = 89 * 10 = 890 | HashD2 * QA = 17 * 10 = 170 | | 10 |
| D2 * QB = 89 * 100 = 8900 | HashD2 * QB = 17 * 100 = 1700 | | 100 |

| DIBF1 (Index) | Data | Hash | Quantifier |
|---|---|---|---|
| 0 | 0 + 890 + 8900 = 9790 | 0 + 170 + 1700 = 1870 | 0 + 10 + 100 = 110 |
| 1 | 6050 | 1100 | 110 |
| 2 | 6050 + 890 + 8900 = 15840 | 1100 + 170 + 1700 = 2970 | 110 + 10 + 100 = 220 |

DIBF2 computation

| DIBF2 (Index) | Data | Hash | Quantifier |
|---|---|---|---|
| 0 | 0 + 890 = 890 | 0 + 170 = 170 | 0 + 10 = 10 |
| 1 | 6050 | 1100 | 110 |
| 2 | 6050 + 890 = 6940 | 1100 + 170 = 1270 | 110 + 10 = 120 |

Calculating the difference
DIBFDiff = DIBF1 − DIBF2

| DIBFDiff (Index) | Data | Hash | Quantifier |
|---|---|---|---|
| 0 | 9790 − 890 = 8900 | 1870 − 170 = 1700 | 110 − 10 = 100 |
| 1 | 6050 − 6050 = 0 | 1100 − 1100 = 0 | 110 − 110 = 0 |
| 2 | 15840 − 6940 = 8900 | 2970 − 1270 = 1700 | 220 − 120 = 100 |

Decoding original data
Generate original data and hash value for row 0 (or row 2):
Data = 8900/100 = 89
Hash = 1700/100 = 17
Test, if the row is a single row entry:
Hash(Data) = 8 + 9 = 17 (correct => valid single entry)
Result
A single entry with Data 89 and Quantifier 100 was decoded. A positive value of the quantifier indicates a missing row in DIBF2.
Encode Entry
$$DIBFData_{[index]} = Refcount_0 * D_0 + Refcount_1 * D_1 + \ldots + Refcount_n * D_2$$
$$DIBFHash_{[index]} = Refcount_0 * hash(D_0) + Refcount_1 * hash(D_1) + \ldots + Refcount_2 * hash(D_n)$$
$$Refcount_{[index]} = Refcount_0 + Refcount_1 + \ldots + Refcount_2$$
Decoding
$$OriginalData = \frac{DIBFData_{[index]}}{Refcount_{[index]}}$$

$$OriginalHash = \frac{DIBFHash_{[index]}}{Refcount_{[index]}}$$

Test for Single Element in entry
$$hash\left(\frac{IBFData_{[index]}}{Refcount_{[index]}}\right) == \frac{IBFHash_{[index]}}{Refcount_{[index]}}$$

With reference to FIGS. 4A and 4B and Table 1, FIG. 4A is a block diagram illustrating how two DIBF records of a first data set are calculated and encoded to a first DIBF data structure (e.g., a first table), according to embodiments. FIG. 4A illustrates the process of using the sum of values as a hashing function. Two fixed data values D1=55 and D2=89 (e.g., $D_0$ and $D_1$ of FIG. 2) are encoded into two DIBF records, of a DIBF data structure (e.g., three-array table). Two different quantifier values (e.g., QA=10 and QB=100) are correspond to each of the fixed data. As discussed, two data records with the same fixed data part generate an equal hash value (before multiplication) and get added to the same set of DIBF record entries in the DIBF data structure. As such, the data value 55 is inserted at two insertion positions corresponding to the indexes 1 and 2 of the table 401. And the value 89 is inserted into two insertion positions corresponding to the indexes 0 and 2 of table 401-1. In embodiments, tables 401 and 401-1 are the same data structure at different points in time. For example, table 401 may illustrate the data that is contained therein at a first time and table 401-1 may illustrate the data that is contained therein at a second time, which is subsequent to the first time.

In some embodiments, FIGS. 4A and 4B represent that at least two different sources (e.g., server hosts) reference the DIBF records, as shown by 2 different quantifier values. Accordingly, calculations are performed twice for each data value, as illustrated at least in the DIBF record 403 for example. Although FIGS. 4A and 4B are illustrated as having two fixed data values that have been parsed, with a specific values, it is understood that in other embodiments, a payload is parsed into more or fewer fixed data units and/or different or additional data values can exists other than values 55 and 89. The DIBF record 403 shows that that D1 fixed value of 55 is multiplied by 10, which is the quantifier value to arrive at 550. The process is repeated for the quantifier of 100 to arrive at 5500. The hash value (assumed to be 10, e.g., 5+5) is first multiplied by the quantifier 10 to arrive at 100, which is the hash data element. This process is then repeated to arrive at 1000 for the second hash data element.

Once these values are individually computed, they are added together and the summarization value is reflected in the table 401. Specifically, the product values 550 and 5500 are added together to arrive at a value of 6050 at index 1 and 2 of the data field. Further, the product values 100 and 1000 are added together to arrive at a total hash data element value of 1100 at index 1 and 2 of the hash data portion. And the product values of 10 and 11 in the quantifier column of 403 are added together to arrive at a value of 110 at index 1 and 2 of the quantifier field of the table 401.

Identical calculations are performed for the second DIBF record 405 compared to those as specified at the first DIBF record 403. The table 401-1 then gets appended to using a combination of the summarization calculations from the table 401 and the DIBF record 405. At index 0 under the data column of table 401-1, because the entry 403 was not indexed at 0 (i.e., the table 401 has no data at index 0); only values 890 and 8900 from the data column of the entry 405 are added to arrive at a value of 9790. Likewise, because the DIBF record 405 was not inserted or indexed at 1, the value of 6050 (as illustrated in the data column at index 1 and 2 of the table 401) remains at index 1 of the data column of the table 401-1. However, with respect to insertion position index 2, because both DIBF records 403 and 405 inserted data at index 2, 6050 is added to 9790 (i.e., 890+8900) to combine the final summarization for each of the payload data of 55 and 89 to arrive at a final number of 15840 for the fixed data field of the data field. These calculations are identically performed for the hash data field of the data field and the quantifier field of the table 401-1.

FIG. 4B is a block diagram illustrating a second encoded table (i.e., table 409) of a second data set that is subtracted from the first table (i.e., table 401-1) of FIG. 4A and decoded, according to embodiments. Decoding occurs in order to determine the differences (i.e., executing a subtraction operation) between the first data set as found in the table 401-1 of FIG. 4A and the second data set (e.g., two files that have been replicated across two different storage nodes) as found in the table 409 in order to synchronize the data sets.

To compute the difference between the first and second tables (i.e., DIBF data structures), each of its DIBF records are subtracted, as opposed to XORing the data, which is typical in IBF methodologies. If the same data records were added into two DIBF records, the result of the subtraction would be zero (i.e., a zero difference), indicating a match. If the result is not zero (i.e., a non-zero difference), the remaining value is either the sum of multiple records or a single entry multiplied with the quantifier value.

As illustrated in the final result table 411, for index 0 under the sum field, the sum data in index 0 of table 401-1 (i.e., 9790) subtracts the sum data in index 0 of table 409 (i.e., 890) to arrive at a difference of 8900. Likewise, the final result table 411 shows at index 1, the sum data in index 1 of table 401-1 (i.e., 6050) subtracts the sum data in index 1 of table 409 (i.e., 6050) to arrive at a difference of zero, indicating a match or that these entries contain the same identical data. Likewise, the final result table 411 shows at index 2, the sum data in index 2 of table 401-1 (i.e., 15840) subtracts the sum data in index 2 of table 409 (i.e., 6940) to arrive at a difference of 8900.

Once these differences are calculated, the original data can be decoded to generate the original data and hash value at least for row 0 (and/or row 2) (i.e., the rows that have not indicated a match by the 0 difference result, such as row 1). In some embodiments, this step is performed to see exactly what set of data is missing or corrupt in a larger set of data. This is in contrast to other methods, such as checksums that fail to give many clues about corruption details. Regarding the specific decoding associated with FIGS. 4A and 4B, the original data is generated by dividing 8900 by 100 to get 89 and the hash final result 1700 is divided by 100 to get 17. To test if the row or record is a single row entry, the generated hash (17) is compared to another generated hash, such as at D2—8+9=17. The result is that a single entry with data value 89 (e.g., a replicated data unit of data value 89) and quantifier 100 was decoded. Any positive value of the quantifier indicates a missing row in the table 409, such as is illustrated here. Accordingly, not only can a flag be set indicating that data is not synchronized, but an indication that the exact data unit 89 was missing in a specific table.

Figure 5:
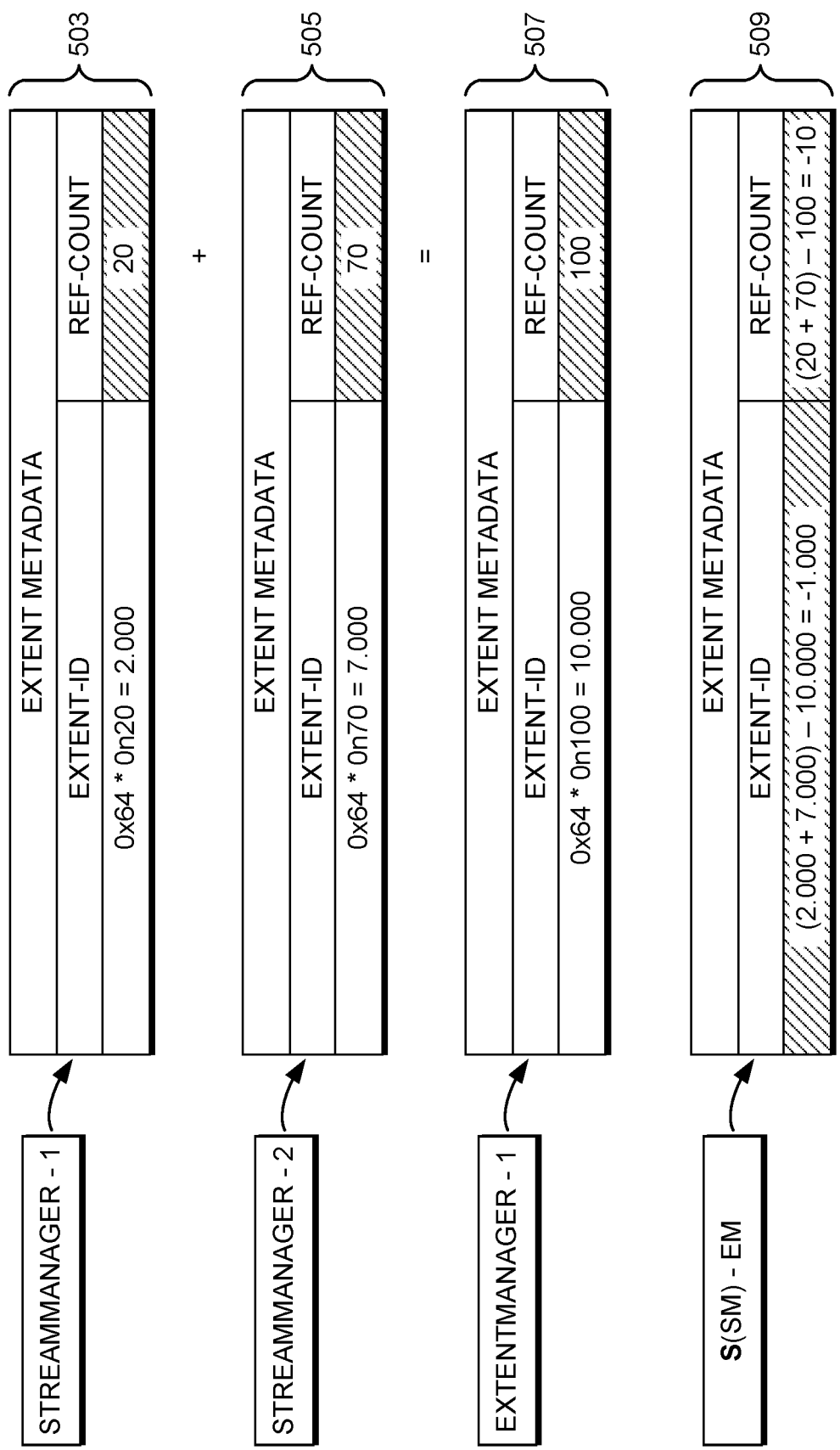
FIG. 5 is a schematic diagram illustrating an example distributed data synchronization operation, in accordance with embodiments of the present invention.

FIG. 5 is a block diagram illustrating whether data is synchronized in a distributed computing system, according to embodiments. In some embodiments, each of the stream manager 1, stream manager 2, and the extent manager 1 are stored on different hosts (e.g., storage nodes). The stream manager 1 includes its own DIBF record 503, the stream manager 2 includes the DIBF record 505, and the extent manager 1 includes the DIBF record 507. The table 509 represents the subtraction of each of the entries—the sum of stream managers (stream manager 1, 2) minus the sum of all extent managers (extent manager 1). Accordingly, as shown in the table 509, extent manager-1 value of 2.000 is added to extent manager-2 value of 7.000 (9.000), which subtracts 10.000 (the extent manager-1's product estimation). The results is −1.000. stream manager-1's reference count of 20 is added to stream manager-2's reference count of 70, which theoretically should equal 90, if the entries matched. But in this case, the reference count as indicated in the entry 507 reads 100 instead. Accordingly, when 20 is added to 70 (90) and 100 is subtracted, the result is −10, which indicates a mismatch.

In some embodiments of the present invention, DIBF-based implementation of distributed data synchronization includes overflow arithmetic operations for managing overflows in data types; even though the implementation remains reliable in that, temporary values, such as product of the fixed data elements and the quantifier value may be incorrect if the corresponding original data can be reconstructed. In practice the quantifier field of the record may be limited in range. For example, the number of extent references per stream in distributed computing system would not exceed one million. By expanding the data type of the fixed data and hash from an 8-bit byte to a signed 32-bit integer, the product of an extent reference and any byte of the data/hash does not lead to an overflow. The minimum/maximum value of the quantifier value would be:

$$Q_{minmax} = \pm \frac{2^{DataTypeBits-1}}{2^8} = \pm \frac{2^{32-1}}{2^8} = \pm 8{,}388{,}608$$

In addition, different data records are merged by addition. The sum of multiple data records may never be used directly as only single data elements in DIBF records can be extracted. The single-record property is determined by re-computing the hash value. Overflown data or hash records would not increase the probability of a false positive of the hash re-calculation and comparison. Before the data gets extracted, the data of all but one data record gets subtracted from the DIBF record entry. Therefore, the number of underflows during subtraction would match the number of overflows during addition. On some systems an overflowing type would 'wrap around' during addition, making this process reversible if the same value is subtracted again. Division of two integers may lead to loss of accuracy if the division leaves a rest. A single data/hash element is dividable by the quantifier value without rest as it is a product of the original data and the quantifier value. The division of DIBF records storing a combination of data records would lead to inaccurate results. Those can be neglected as they're unusable for decoding original records and get filtered out during hash comparison.

Each of the processes as described herein is configured to be implemented within various particular embodiments. For example, in a distributed computing system, the distributed data synchronization operations, for example, can be utilized to verify or synchronize distributed data block metadata, such as extent metadata. In these embodiments, the quantifier values represent the reference count of the extent. In other computing environments, to improve resiliency, data fragments and a parity fragment are stored across multiple storage clusters (e.g., nodes 110 of FIG. 11). The processes described herein can be used to compare checksums of data fragments against parity fragments. In some embodiments, extent metadata is synchronized between extent nodes that store the data. During a "cold sync," mostly triggered by maintenance or failure, all extents can be synchronized. This includes transferring large amounts of extent metadata of matching records. Using the processes described herein, the network traffic can be reduced.

Advantageously, embodiments described herein improve computing operations for distributed data synchronization for distributed files and corresponding distributed data blocks that are managed using data managers in a distributed computing system. In particular, the improvement to computing operations associated with DIBF operation client, DIBF data structure, and other components in a distributed computing system results in computing efficiency. For example, network latency is reduced in the distributed computing system infrastructure and throughput is increased as the distributed data synchronization operations more efficiently identify overlapping data records in data managers, as such, eliminating the burden of transferring a significant portion of the distributed data across the distributed computing system network.

Moreover, the storage and retrieval of distributed is improved using the DIBF data structure and other types of distributed data synchronization objects and operations alleviate computational overhead. The distributed data synchronization operations are implemented based on an unconventional arrangement of data managers and a set of defined unconventional rules for an ordered combination of steps of distributed data synchronization. In this regard, the distributed data synchronization system addresses the specific problem of managing distributed data and improves the existing data synchronization processes in distributed computing system. Overall, these improvements also result in less CPU computation, smaller memory requirements, and increased flexibility in distributed data synchronization.

With reference to FIG. 1, FIG. 1 illustrates an exemplary distributed computing system 100 (or distributed storage system) in which implementations of the present disclosure may be employed. In particular, FIG. 1 shows a high level architecture of distributed computing system 100 having components in accordance with implementations of distributed data synchronization of the present disclosure. The distributed computing system corresponds to the distributed computing system described herein with reference to FIG. 9 and FIG. 10. Among other managers, components, or engines ("collectively components") not shown, the distributed computing system 100 includes a front-end layer 110, a partition layer 120, and a stream layer 130. The distributed computing system 100 can include a front-end (FE) layer 110 having front end-servers (e.g., front server 112); a partition layer 120 having a partition master 126, partition servers (e.g., partition server 124) and stream managers (e.g., stream manager 122); and a stream layer 130 having extent nodes (ENs) (e.g., EN 134); extent managers (e.g., extent manager 132); and distributed data synchronization operations client 140. The stream layer can include a state manager 150 for distributed management of stream and extent metadata. Each of the identified components may represent a plurality of different instances of the component. The components of the distributed computing system 100 may communicate with each other over one or more networks (e.g., public network or virtual private network "VPN"). The network (not shown) may include, without limitation, one or more local area networks (LANs) and/or wide area networks (WANs).

Figure 6:
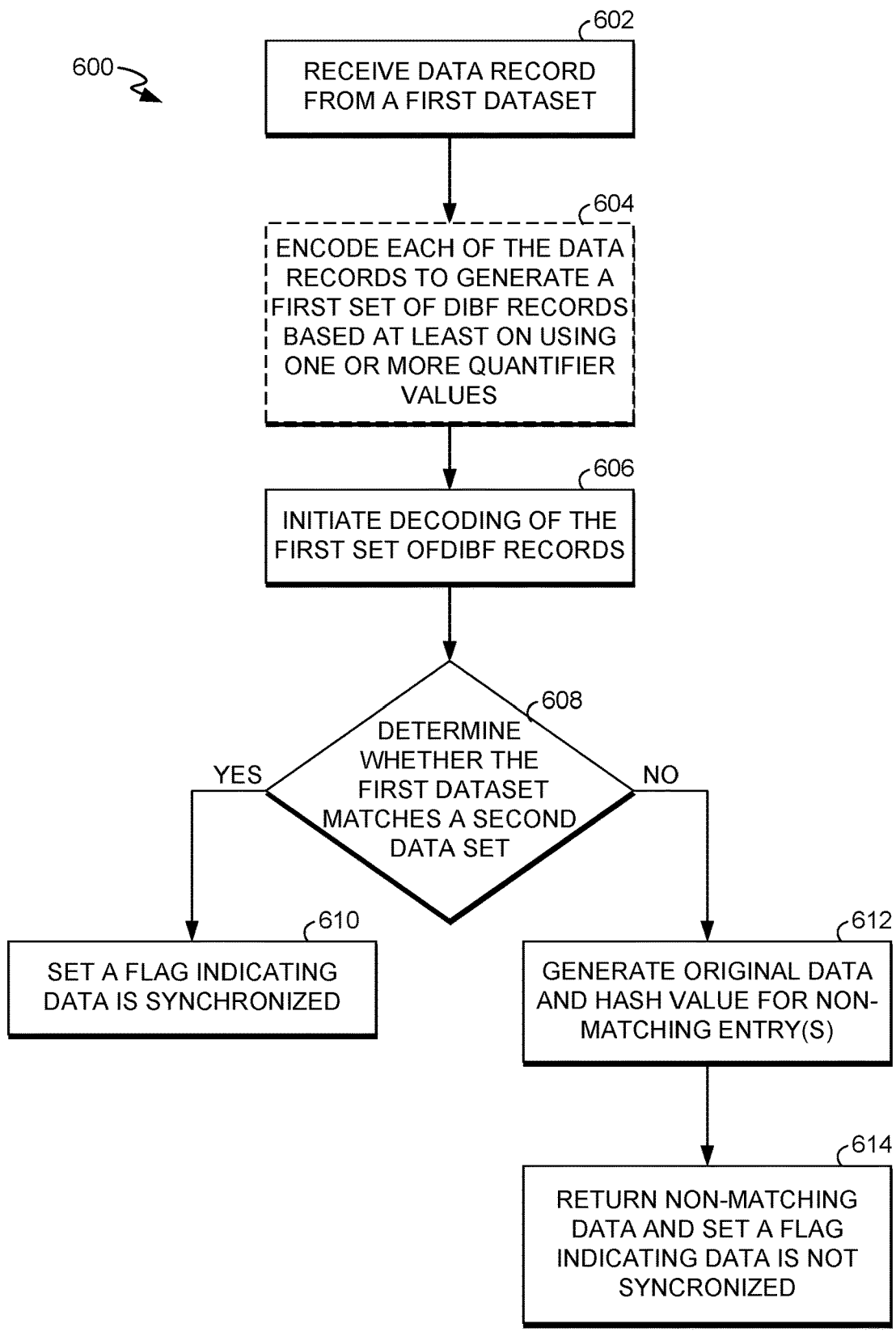
FIG. 6 is a flow diagram illustrating an example distributed data synchronization operation, in accordance with embodiments of the present invention.
Figure 7:
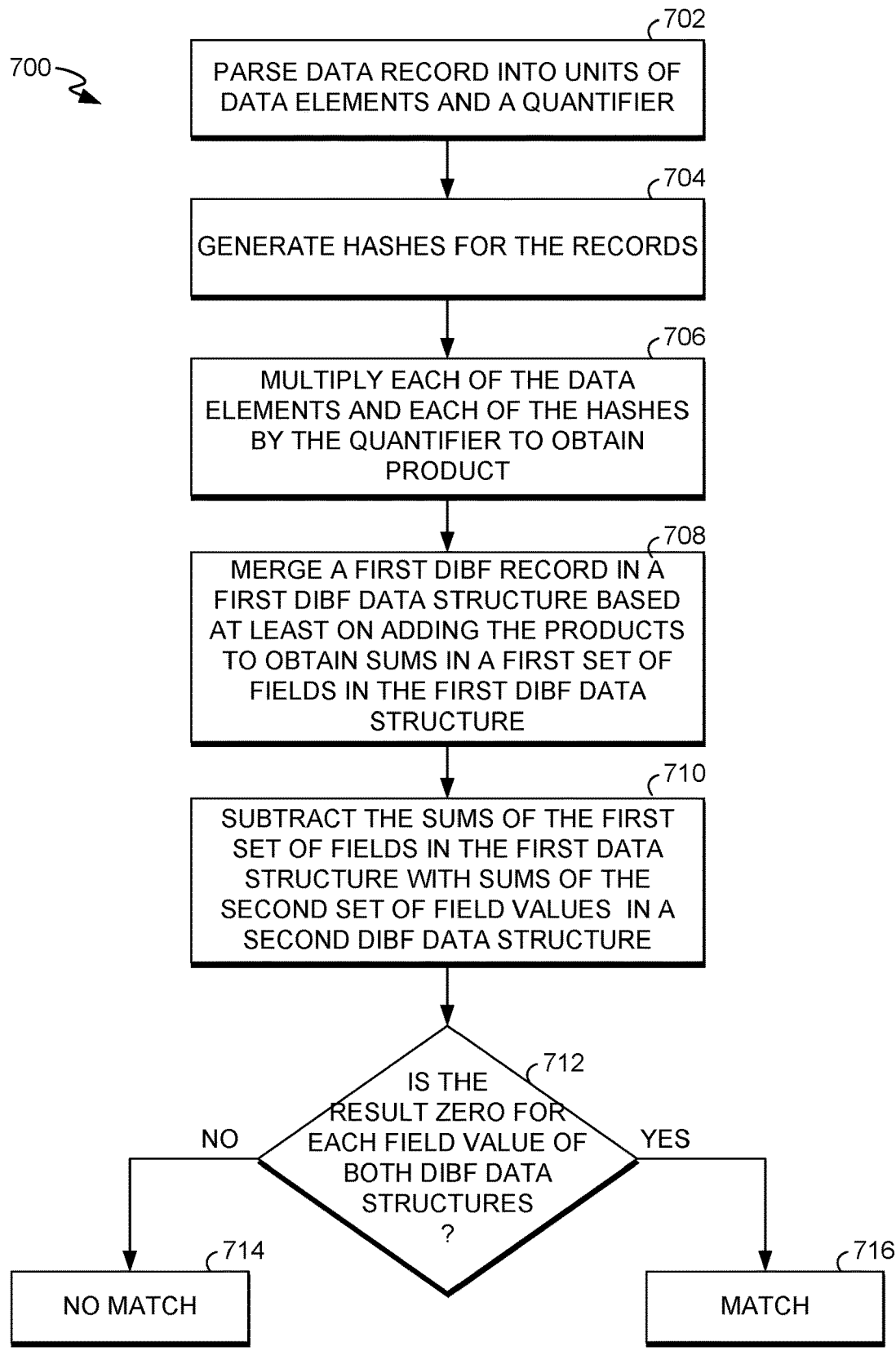
FIG. 7 is a flow diagram illustrating an example distributed data synchronization operation, in accordance with embodiments of the present invention.
Figure 8:
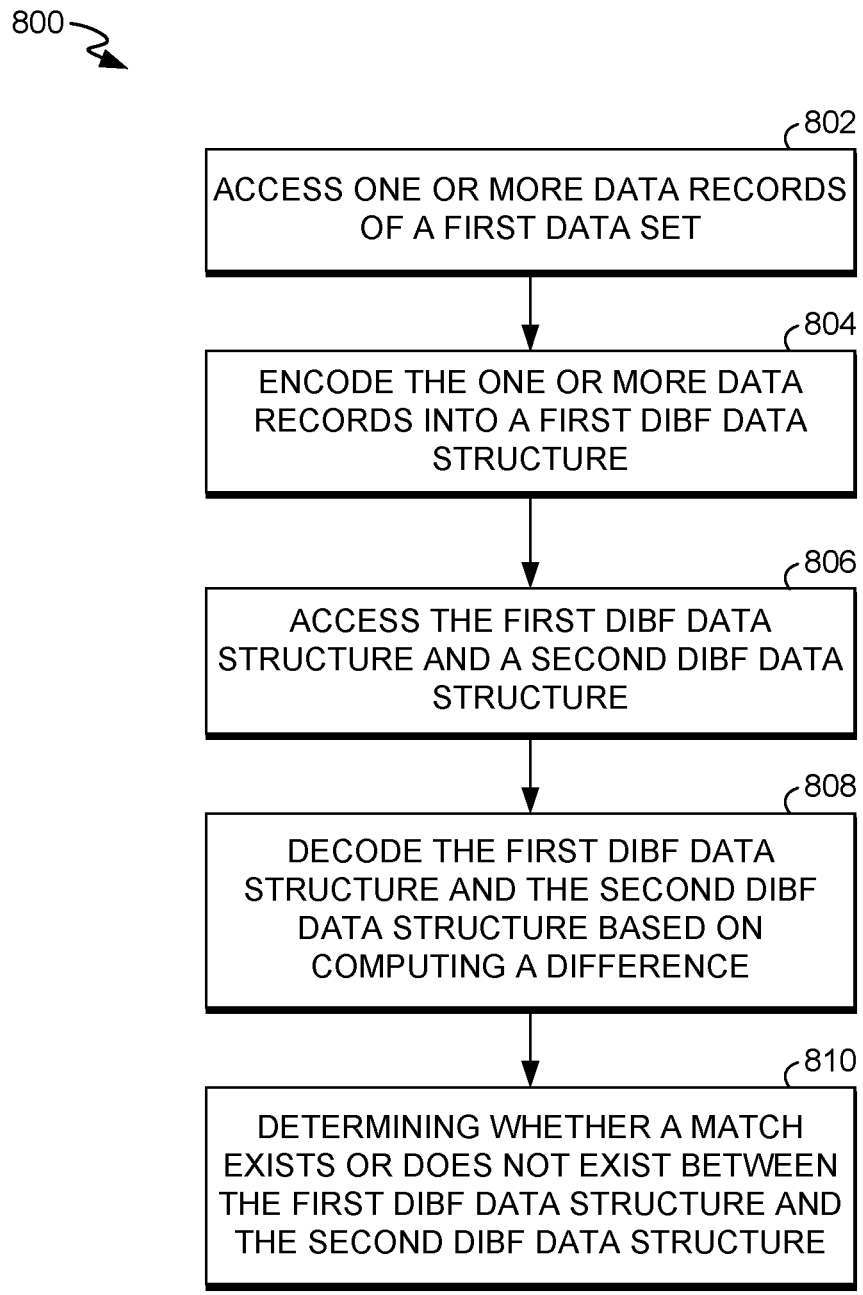
FIG. 8 is a flow diagram illustrating an example distributed data synchronization operation, in accordance with embodiments of the present invention.

With reference to FIGS. 6, 7, and 8, flow diagrams are provided illustrating methods for implementing disturbed data synchronization for a distributed computing system. The methods can be performed using the distributed computing system described herein. In embodiments, one or more computer storage media having computer-executable instructions embodied thereon that, when executed, by one or more processors, can cause the one or more processors to perform the methods in the distributed computing system 100.

FIG. 6 is a flow diagram illustrating a process 600 for determining whether data is synchronized, according to embodiments. Per block 602, one or more payload records are accessed from a first data set. Payload records can be any suitable records, such as extent metadata payloads. The first data set can be any suitable set of data, such as one or more files, blocks, sequences, and/or any other data unit. Per block 604, each of the one or more payload records are encoded to generate a first set of field values for fields in a DIBF record. The first set of field values are based at least on using one or more quantifier values. The one or more payload records can be parsed into fixed data units and a quantifier value, the fixed data units can be hashed, and then the quantifier value can be multiplied by the fixed data units and hash data units to generate fixed data elements and hash data elements respectively. These entries can then be appended to a data structure using a DIBF record.

Per block 606, a decoding of the first set of field values is initiated. In some embodiments, this initiation can be or include the subtraction operations described herein. As part of the decoding process, per block 608, it is determined whether the first dataset matches a second data set based on comparing a difference between a first data structure and a second data structure, where the first data structure is associated with data records from a first data set and the second data structure is associated with data records from a second data set. For example if a final difference of zero (i.e., zero difference) is determined based on comparing the two data structures, this would amount to "matching" and any non-zero number (i.e., non-zero difference) of any entry, such as a positive quantifier value indicates non-matching data for the entire data set, even if one or more field values match.

Per block 610, if each of the first set of field values match the second set of field values of the second data set, then a flag is set indicating data is synchronized. For example, a client device or administrator can query the system to see if the first and second data sets are synchronized. The system may responsively perform the process 600, find a match in all records, and set a flag, which may trigger a notification to the client device or administrator specifying that the data is uniform and synchronized.

Per block 612, if one or more of the first set of field values do not match one or more of the second set of field values of the second data set, then the original data (e.g., one or more payloads in an unparsed state or particular data elements) and one or more hash data elements for non-matching field values are generated to see which field values, data elements, and/or payloads are missing or otherwise corrupted. Per bock 614, the non-matching one or more field values and/or data payloads/fixed values are then returned (e.g., to a client device or a display screen of an administrator) and an indication that the first and second data sets are not synchronized. Accordingly, in response to the generating back the payload or individual data elements of the payload, a notification can be transmitted to a computing device that indicates which of the plurality of data elements or payloads do not match.

FIG. 7 is a flow diagram of a process 700 for determining whether sets of data match, according to embodiments. Per block 702 one or more payload records are parsed into fixed data units and a quantifier value. Per block 704, one or more hash data units are generated for the payload record(s). For example, a hash can be computed for each fixed data unit. The hash function can also be used at least to index the data for retrieval in a data structure. Per block 706, each data element and hash is multiplied by the quantifier field value in the quantifier field.

Per block 708, after the first set of one or more DIBF record values are generated, they are merged into a first DIBF data structure based at least on adding the products calculated in block 706. In some embodiments, the merge or insertion point is based at least on utilizing a pseudorandom number generator. For example, an initial insertion value can be based on a hash as a seed as a pseudorandom number generator to determine entry locations in a DIBF data structure. Then products can be added. Per block 710, the sums of the first set of field values of the first DIBF data structure calculated at block 708 are subtracted with the sums of a second set of field values in a second data structure.

Per block 712, it is determined whether the result of the subtraction at block 710 is zero for each entry of both DIBF data structures. If the result is zero, then per block 716, it is determined that there is a match. Accordingly, when DIBF data structures (i.e., corresponding fields) are subtracted, the result is zero, indicating that the one or more DIBF record at index 1 are matched. If each of the one or more DIBF records matched, as described above, a flag can be set indicating the data is synchronized. Per block 714, if the result is not zero at block 712 for any of the DIBF record values, then no match would be indicated. And as described above, the original data and hash value can be generated for the non-matching field values and they can be returned indicating non-synchronization.

Turning to FIG. 8, a flow diagram is provided that illustrates a method 800 for providing distributed data synchronization in a distributed computing system. Per block 802, a first data record of a first data set is accessed. Per block 804, the first data record is encoded into a first distributed invertible bloom filter ("DIBF") data structure. Encoding the first data record generates, for the first DIBF data structure, a first DIBF record based on the first data record. The first DIBF record comprises a data field and a quantifier field, where the quantifier field includes a quantifier value that represents a reference count for the first DIBF record. Encoding the first data record into the first DIBF data structure comprises: generating a plurality of hash data units based on a plurality fixed data units of the first data record, multiplying a plurality of fixed data units of the first data record by the quantifier value to generate fixed data elements for the first DIBF record, and multiplying the plurality of hash data units of the first data record by the quantifier value to generate hash data elements for the first DIBF record. The data field comprises a fixed data field and hash data field, where the fixed data field comprises the fixed data elements; and where the hash data field comprises the hash data elements.

Encoding the first data record into the first DIBF data structure further comprises: computing at least one insertion position, and inserting the first DIBF record into the first DIBF data structure at the at least one insertion position of the first DIBF data structure. Inserting the first DIBF record comprises: adding the fixed data elements to existing fixed data elements in the at least one insertion position, adding the hash data elements to existing hash data elements in the at least one insertion position; and adding the quantifier value to an existing quantifier value in the at least one insertion position, where an addition operation for adding is a substitute for an exclusive disjunction ("XOR") operation.

Per block 806, the first DIBF data structure and a second DIBF data structure are accessed, the second DIBF data structure comprises a second DIBF record. Per block 808, the first DIBF data structure and the second DIBF data structure are decoded, where decoding the first DIBF data structure and the second DIBF data structure comprises computing a difference between at least the quantifier value of the first DIBF data structure and a quantifier value of the second DIBF data structure. Computing a difference further comprises: computing a difference between fixed data elements of the first DIBF data structure and fixed data elements of the second DIBF data structure, and computing a difference between hash data elements of the first DIBF data structure and hash data elements of the second DIBF data structure.

Per block 810, based on decoding the first DIBF data structure and the second DIBF data structure, it is determined whether a match exists between the first data DIBF data structure and the second DIBF data structure. The match exists when each of the following: the difference between fixed data elements of the first DIBF data structure and fixed data elements of the second DIBF data structure, the difference between hash data elements of the first DIBF data structure and hash data elements of the second DIBF data structure, and the difference between the quantifier value of the first DIBF data structure and the quantifier value of the second DIBF data structure, result in a zero difference.

The match does not exist when any of the following: the difference between fixed data elements of the first DIBF data structure and fixed data elements of the second DIBF data structure, the difference between hash data elements of the first DIBF data structure and hash data elements of the second DIBF data structure, and the difference between the quantifier value of the first DIBF data structure and the quantifier value of the second DIBF data structure, result in a non-zero difference. Decoding the first DIBF data structure and the second DIBF data structure further comprises: upon determining that the match does not exist, decoding a data unit for the first data record and decoding a hash unit for the first data record based on division operations; and determining whether the first DIBF record is a single DIBF record entry based on the decoded data unit, the hash unit, and a hash function.

Figure 9:
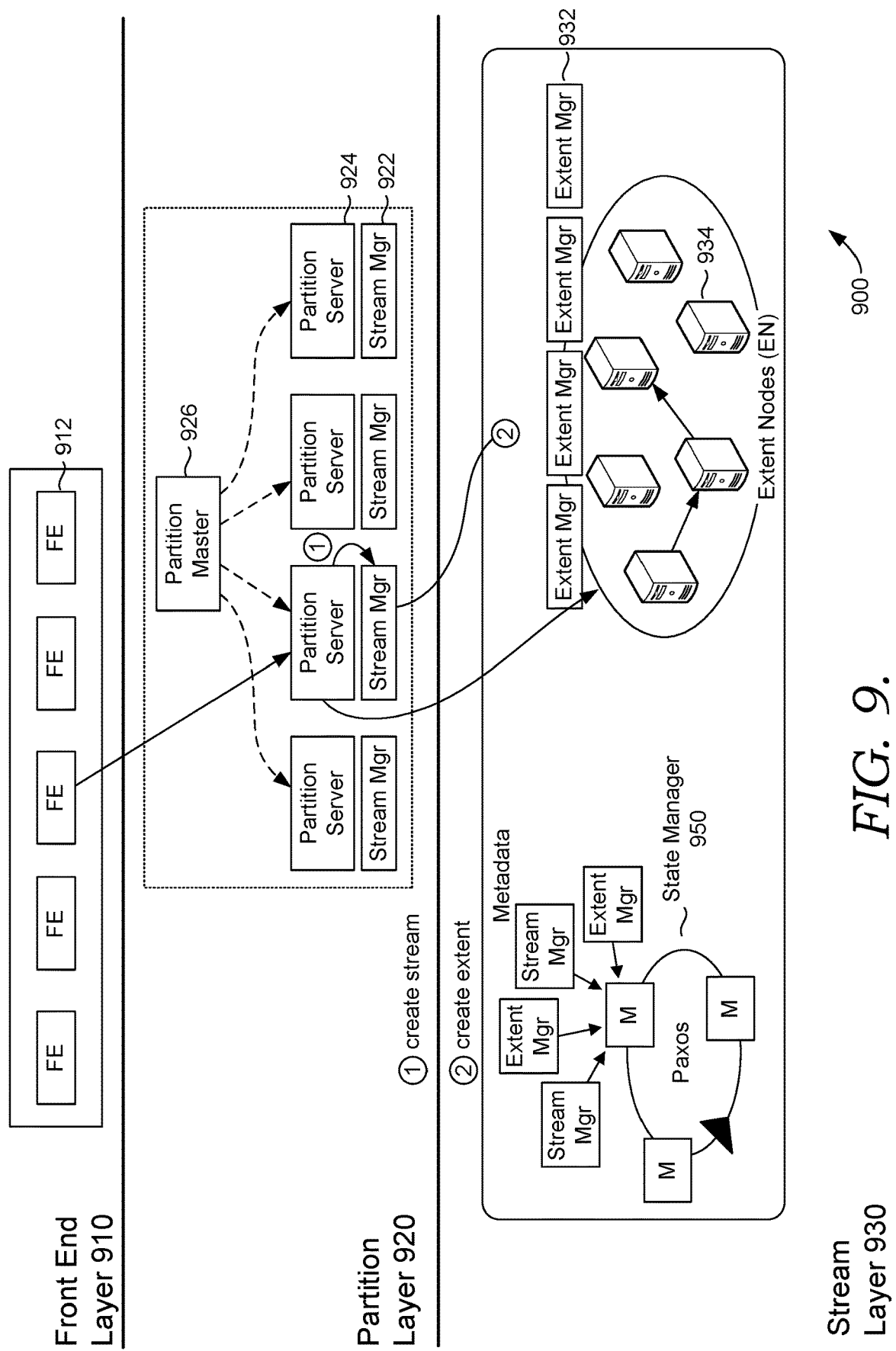
FIG. 9 is a block diagram of an example distributed computing environment suitable for use in implementing embodiments of the present invention.

With reference to FIG. 9, by way of background, a distributed computing system 900 can include components that support distributed data synchronization. In particular, a front-end layer 910, a partition layer 920, and a stream layer 930, can be components of the distributed computing system 900. The distributed computing system 900 can include a front-end (FE) layer 910 having front end-servers (e.g., front server 912); a partition layer 920 having a partition master 926, partition servers (e.g., partition server 924) and stream managers (e.g., stream manager 922); and a stream layer 930 having extent nodes (ENs) (e.g., EN 934); extent managers (e.g., extent manager 932). The stream layer can include a state manager 950 for distributed management of stream and extent metadata.

In some embodiments, the state manager 950 can be implemented based on a distributed computing system (not shown) operating with the stream layer 930. Extents and streams can be partitioned and managed by many distributed extent managers and stream managers. The partition layer 920 can use the extent managers and stream managers to create user extents and user streams, for persisting customer data. An extent manager and stream manager can persist their own data in distributed computing system 900 system extents and system streams. System extents and system streams are managed by the state manager (not shown). The state manager 250 (or a bootstrap layer state manager 150) operates with extent managers and stream managers to manage system extents and systems streams.

The distributed metadata stream layer 930 is distributed to scale out while maintaining highly availability and strong consistency of the metadata in the distributed storage system. The distributed metadata stream layer 930 operates in a coordinated manner with the partition layer 920. The distributed stream metadata and extent metadata are implemented based on the distributed metadata stream layer 930 imposing system restrictions which impact the partition layer in order to leverage the distributed metadata stream layer 930 efficiently. In this regard, the partition layer 920 can also be optimized to facilitate metadata management in the distributed metadata stream layer 930. The design and architecture includes considerations for both the distributed metadata stream layer 930 and the partition layer 920. The distributed computing system 900 can provide a namespace and stores data by partitioning all of the data objects within a storage cluster. The front-end layer 910 can consist of a set of stateless server that take incoming requests. A detailed discussion of a suitable architecture of the distributed storage system for performing embodiments described herein is further described in U.S. application Ser. No. 15/080,465 filed Mar. 24, 2016 and entitled "DISTRIBUTED METADATA MANAGEMENT IN A DISTRIBUTED STORAGE SYSTEM," which is incorporated herein, by reference, in its entirety.

With reference to the distributed computing system, embodiments described herein support supports storing and retrieving data objects across global data centers to maximize utilization of computing resources in a distributed computing system. In particular, the distributed computing system implements a strongly consistent, versioned object store that encodes objects across global data centers. The distributed computing system components refer to integrated components for distributed computing system management. The integrated components refer to the hardware architecture and software framework that support distributed computing system management functionality using the distributed computing system. The hardware architecture refers to physical components and interrelationships thereof and the software framework refers to software providing functionality that can be implemented with hardware embodied on a device. The end-to-end software-based distributed computing system can operate within the distributed computing system components to operate computer hardware to provide distributed computing system functionality. As such, the distributed computing system components can manage resources and provide services for the distributed computing system functionality. Any other variations and combinations thereof are contemplated with embodiments of the present invention.

By way of example, the distributed computing system can include an API library that includes specifications for routines, data structures, object classes, and variables may support the interaction between the hardware architecture of the device and the software framework of the distributed computing system. These APIs include configuration specifications for the distributed computing system such that the different components therein can communicate with each other in the distributed computing system, as described herein.

Figure 10:
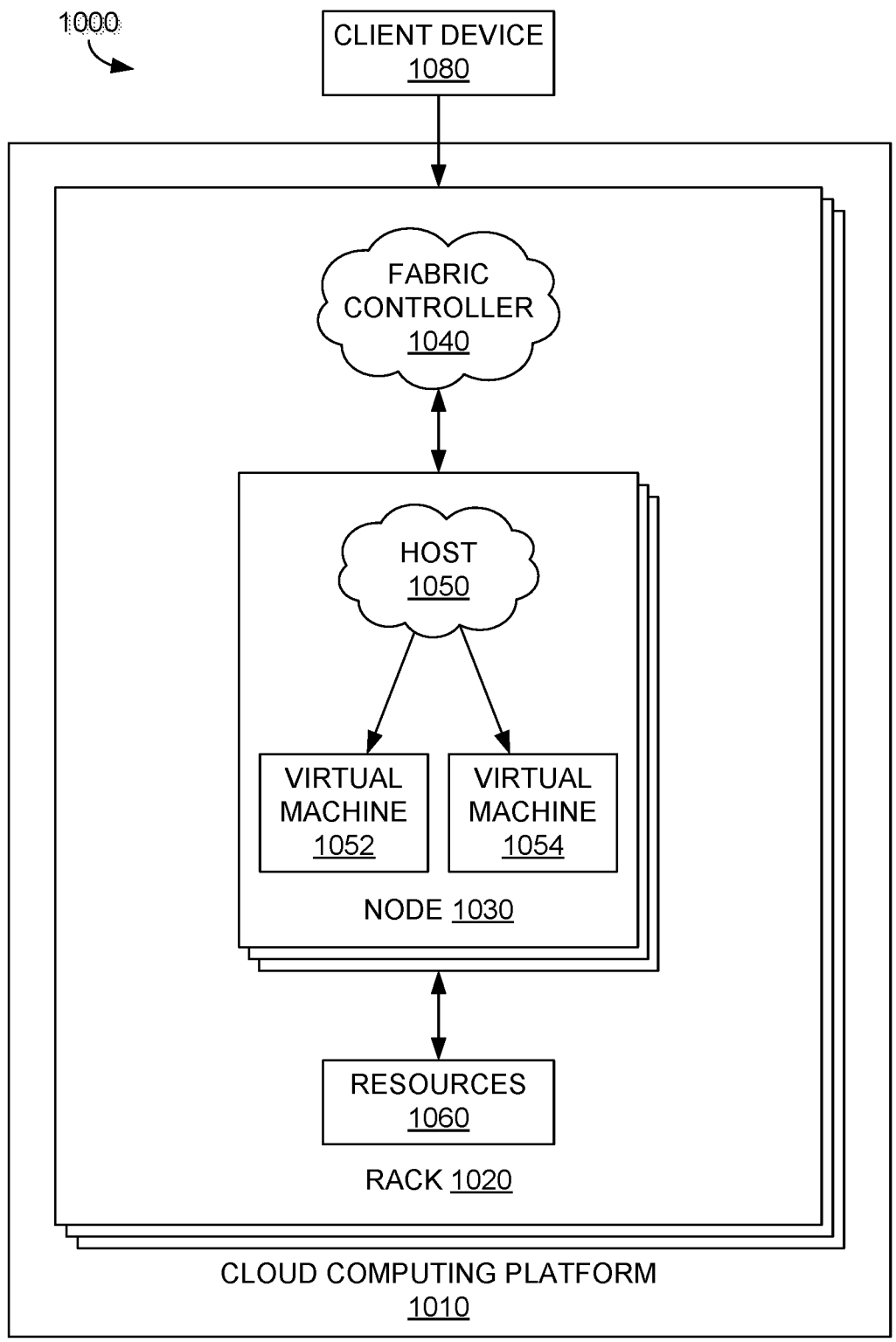
FIG. 10 is a block diagram of an example distributed computing environment suitable for use in implementing embodiments of the present invention.

Referring now to FIG. 10, FIG. 10 illustrates an exemplary distributed computing environment 1000 in which implementations of the present disclosure may be employed.

In particular, FIG. 10 shows a high level architecture of the distributed computing system ("system") in a cloud computing platform 1010, where the system supports seamless modification of software component. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Data centers can support the distributed computing environment 1000 that includes the cloud computing platform 1010, rack 1020, and node 1030 (e.g., computing devices, processing units, or blades) in rack 1020. The system can be implemented with a cloud computing platform 1010 that runs cloud services across different data centers and geographic regions. The cloud computing platform 1010 can implement a fabric controller 1040 component for provisioning and managing resource allocation, deployment, upgrade, and management of cloud services. Typically, the cloud computing platform 1010 acts to store data or run service applications in a distributed manner. The cloud computing infrastructure 1010 in a data center can be configured to host and support operation of endpoints of a particular service application. The cloud computing infrastructure 1010 may be a public cloud, a private cloud, or a dedicated cloud.

The node 1030 can be provisioned with a host 1050 (e.g., operating system or runtime environment) running a defined software stack on the node 1030. Node 1030 can also be configured to perform specialized functionality (e.g., compute nodes or storage nodes) within the cloud computing platform 1010. The node 1030 is allocated to run one or more portions of a service application of a tenant. A tenant can refer to a customer utilizing resources of the cloud computing platform 1010. Service application components of the cloud computing platform 1010 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by the nodes 1030, the nodes may be partitioned into virtual machines (e.g., virtual machine 1052 and virtual machine 1054). Physical machines can also concurrently run separate service applications. The virtual machines or physical machines can be configured as individualized computing environments that are supported by resources 1060 (e.g., hardware resources and software resources) in the cloud computing platform 1010. It is contemplated that resources can be configured for specific service applications. Further, each service application may be divided into functional portions such that each functional portion is able to run on a separate virtual machine. In the cloud computing platform 1010, multiple servers may be used to run service applications and perform data storage operations in a cluster. In particular, the servers may perform data operations independently but exposed as a single device referred to as a cluster. Each server in the cluster can be implemented as a node.

Client device 1080 may be linked to a service application in the cloud computing platform 1010. The client device 1080 may be any type of computing device, which may correspond to computing device 1000 described with reference to FIG. 11, for example. The client device 1080 can be configured to issue commands to cloud computing platform 1010. In embodiments, client device 1080 may communicate with service applications through a virtual Internet Protocol (IP) and load balancer or other means that directs communication requests to designated endpoints in the cloud computing platform 1010. The components of cloud computing platform 1010 may communicate with each other over a network (not shown), which may include, without limitation, one or more local area networks (LANs) and/or wide area networks (WANs).

Having described various aspects of the distributed computing environment 1000 and cloud computing platform 1010, it is noted that any number of components may be employed to achieve the desired functionality within the scope of the present disclosure. Although the various components of FIG. 10 are shown with lines for the sake of clarity, in reality, delineating various components is not so clear, and metaphorically, the lines may more accurately be grey or fuzzy. Further, although some components of FIG. 10 are depicted as single components, the depictions are exemplary in nature and in number and are not to be construed as limiting for all implementations of the present disclosure.

Figure 11:
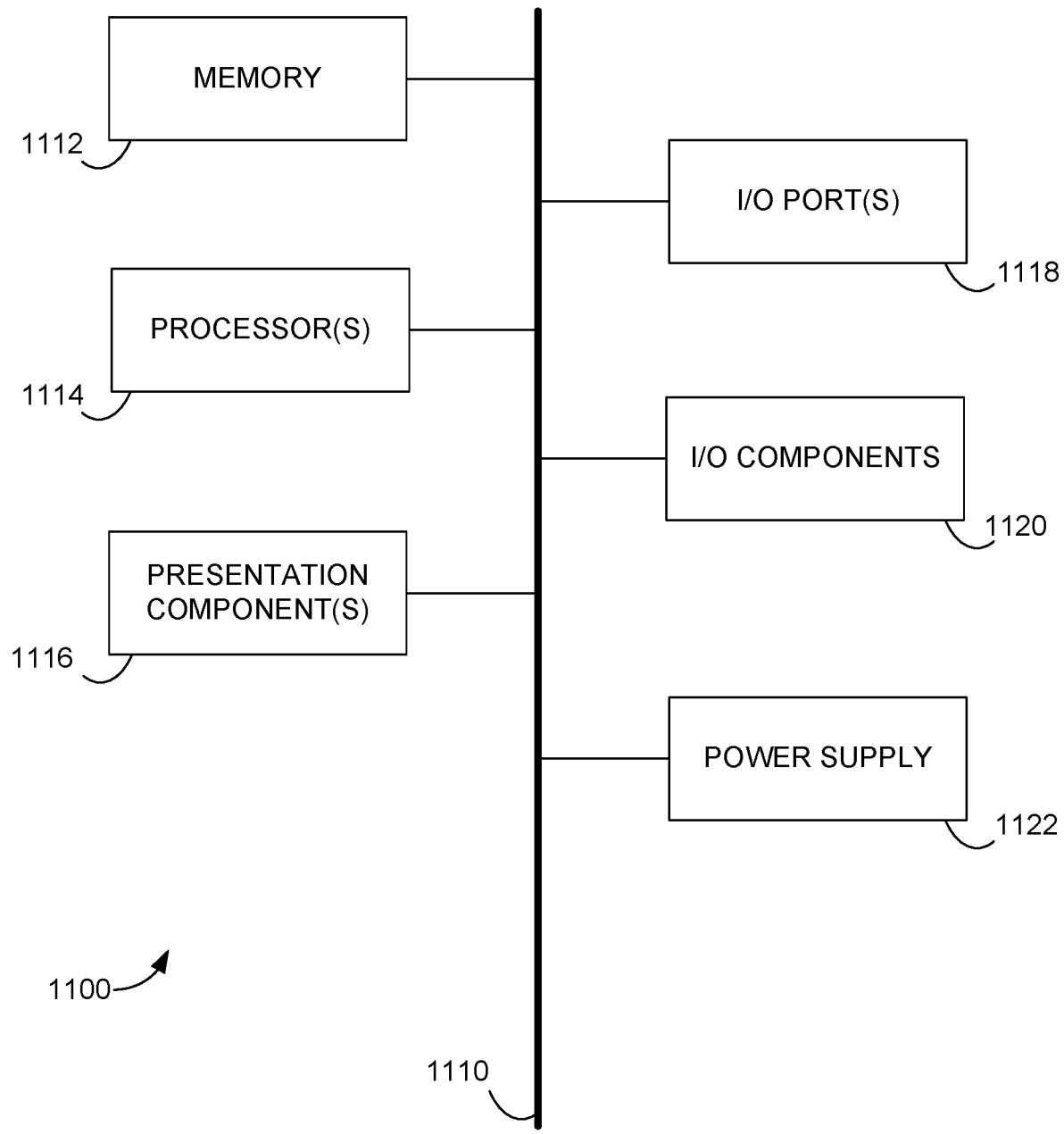
FIG. 11 is a block diagram of an example computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output ports 1118, input/output components 1120, and an illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the distributed computing system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

The invention claimed is:

1. A system for implementing distributed data synchronization in a distributed computing system, the system comprising:
   one or more processors; and
   one or more computer storage media storing computer-useable instructions that, when used by the one or more processors, cause the one or more processors to execute:
   accessing a first data record of a first data set;
   encoding the first data record into a first distributed invertible bloom filter (DIBF) data structure, wherein encoding the first data record generates, for the first DIBF data structure, a first DIBF record based on the first data record, wherein the first DIBF record comprises a data field and a quantifier field, wherein the quantifier field includes a quantifier value that indicates a quantity of references that a plurality of server hosts use to access the first data record;

accessing the first DIBF data structure and an encoded second DIBF data structure, wherein the second DIBF data structure comprises a second DIBF record;

decoding the first DIBF data structure and the second DIBF data structure, wherein decoding the first DIBF data structure and the second DIBF data structure comprises computing a difference between at least the quantifier value of the first DIBF data structure and a quantifier value of the second DIBF data structure;

based on decoding the first DIBF data structure and the second DIBF data structure, determining that a match exists between the first data DIBF data structure and the second DIBF data structure; and based on decoding the first DIBF data structure and the second DIBF data structure, determining that a match does not exist between the first data DIBF data structure and the second DIBF data structure.

2. The system of claim 1, wherein encoding the first data record into the first DIBF data structure comprises:
generating a plurality of hash data units based on a plurality fixed data units of the first data record;
multiplying a plurality of fixed data units of the first data record by the quantifier value, to generate fixed data elements for the first DIBF record; and
multiplying the plurality of hash data units of the first data record by the quantifier value, to generate hash data elements for the first DIBF record.

3. The system of claim 1, based at least in part on the decoding and the quantifier value, synchronizing the first data set across the plurality of server hosts.

4. The system of claim 2, wherein encoding the first data record into the first DIBF data structure further comprises:
computing at least one insertion position; and
inserting the first DIBF record into the first DIBF data structure at the at least one insertion position of the first DIBF data structure.

5. The system of claim 4, wherein inserting the first DIBF record comprises:
adding the fixed data elements to existing fixed data elements in the at least one insertion position;
adding the hash data elements to existing hash data elements in the at least one insertion position; and
summing, via an addition operation, the quantifier value to an another quantifier value in the at least one insertion position, wherein the another quantifier value exists before the adding of the fixed data elements and the adding of the hash data elements, and wherein the addition operation for adding is a substitute for an exclusive disjunction (XOR) operation.

6. The system of claim 1, wherein computing a difference further comprises:
computing a difference between fixed data elements of the first DIBF data structure and fixed data elements of the second DIBF data structure; and
computing a difference between hash data elements of the first DIBF data structure and hash data elements of the second DIBF data structure.

7. The system of claim 1, wherein the match between the first data DIBF data structure and the second DIBF data structure exists when each of the following occurs:

the difference between fixed data elements of the first DIBF data structure and fixed data elements of the second DIBF data structure,
the difference between hash data elements of the first DIBF data structure and hash data elements of the second DIBF data structure, and
the difference between the quantifier value of the first DIBF data structure and the quantifier value of the second DIBF data structure, result in a zero difference.

8. The system of claim 1, wherein the match does not exist when any of the following occur:
the difference between fixed data elements of the first DIBF data structure and fixed data elements of the second DIBF data structure,
the difference between hash data elements of the first DIBF data structure and hash data elements of the second DIBF data structure, and
the difference between the quantifier value of the first DIBF data structure and the quantifier value of the second DIBF data structure, result in a non-zero difference.

9. The system of claim 8, wherein decoding the first DIBF data structure and the second DIBF data structure further comprises:
upon determining that the match does not exist, decoding a data unit for the first data record and decoding a hash unit for the first data record based on division operations; and
determining whether the first DIBF record contains a single DIBF record entry based on the decoded data unit, the hash unit, and a hash function.

10. A computer-implemented method for implementing distributed data synchronization in a distributed computing system, the method comprising:
accessing a first data record;
encoding the first data record into a first distributed invertible bloom filter (DIBF) data structure, wherein encoding the first data record generates, for the first DIBF data structure, a first DIBF record based on the first data record, wherein the first DIBF record comprises a data field and a quantifier field, wherein the quantifier field includes a quantifier value that indicates a quantity of references that one or more server hosts use to access the first DIBF record;
wherein encoding the first data record further comprises:
generating, via a hashing function, a hash data unit based on a fixed data unit of the first data record;
multiplying the fixed data unit of the first data record by the quantifier value to generate a fixed data element for the first DIBF record; and
multiplying the hash data unit of the first data record by the quantifier value, to generate a hash data element for the first DIBF record.

11. The method of claim 10, wherein the data field comprises a fixed data field and hash data field, wherein the fixed data field comprises the fixed data element and the hash data field comprises the hash data element.

12. The method of claim 10, the method further comprising:
accessing a second DIBF record having a fixed data unit of a second data record, wherein the fixed data unit of the first data record matches the fixed data unit of the second data record;
computing at least one insertion position;
inserting the first DIBF record into the first DIBF data structure at the at least one insertion position of the first DIBF data structure; and inserting the second DIBF record into the first DIBF data structure at the at least one insertion position of the first DIBF data structure.

13. The method of claim 10, wherein inserting the first DIBF record comprises:
adding the fixed data element to an existing fixed data element in the at least one insertion position;
adding the hash data element to an existing hash data element in the at least one insertion position; and
summing, via an addition operation, the quantifier value to an existing quantifier value in the at least one insertion position, wherein the addition operation for adding is a substitute for an exclusive disjunction (XOR) operation.

14. One or more computer storage media having computer-executable instructions embodied thereon that, when executed, by one or more processors, cause the one or more processors to perform a method for providing distributed data synchronization in a distributed computing system, the method comprising:
accessing a first distributed invertible bloom filter (DIBF) data structure, wherein the first DIBF data structure comprises a first DIBF record based on a first data record, wherein the first DIBF record comprises a data field and a quantifier field, wherein the quantifier field includes a quantifier value that indicates a quantity of references that one or more server hosts use to access the first DIBF record;
accessing a second DIBF data structure, wherein the second DIBF data structure comprises a second DIBF record;
encoding the first DIBF data structure and the second DIBF data structure; and
decoding the first DIBF data structure and the second DIBF data structure, wherein decoding the first DIBF data structure and the second DIBF data structure comprises computing a difference between at least the quantifier value of the first DIBF data structure and a quantifier value of the second DIBF data structure.

15. The media of claim 14, wherein computing a difference further comprises:
computing a difference between a fixed data element of the first DIBF data structure and a fixed data element of the second DIBF data structure; and
computing a difference between a hash data element of the first DIBF data structure and a hash data element of the second DIBF data structure.

16. The media of claim 14, further comprising, based on decoding the first DIBF data structure and the second DIBF data structure, determining that a match exists between the first data DIBF data structure and the second DIBF data structure.

17. The media of claim 16, wherein the match exists when each of the following:
the difference between the fixed data element of the first DIBF data structure and fixed data element of the second DIBF data structure,
the difference between the hash data element of the first DIBF data structure and the hash data element of the second DIBF data structure, and
the difference between the quantifier value of the first DIBF data structure and the quantifier value of the second DIBF data structure, result in a zero difference.

18. The media of claim 14, further comprising, based on decoding the first DIBF data structure and the second DIBF data structure, determining that a match does not exist between the first data DIBF data structure and the second DIBF data structure.

19. The media of claim 18, wherein the match does not exist when any of the following:
the difference between the fixed data element of the first DIBF data structure and the fixed data element of the second DIBF data structure,
the difference between the hash data element of the first DIBF data structure and the hash data element of the second DIBF data structure, and
the difference between the quantifier value of the first DIBF data structure and the quantifier value of the second DIBF data structure, result in a non-zero difference.

20. The media of claim 18, wherein decoding the first DIBF data structure and the second DIBF data structure further comprises:
upon determining that the match does not exist, decoding a data unit for the first data record and decoding a hash unit for the first data record based on division operations; and
determining whether the first DIBF record contains a single DIBF record entry based on the decoded data unit, the hash unit, and a hash function.

* * * * *